(12) United States Patent
Bohle

(10) Patent No.: US 9,109,649 B2
(45) Date of Patent: Aug. 18, 2015

(54) SYNCHRONIZING DEVICE FOR MOVABLY MOUNTED FURNITURE PART

(71) Applicant: Julius Blum GmbH, Hochst (AT)

(72) Inventor: Wolfgang Bohle, Goetzis (AT)

(73) Assignee: JULIUS BLUM GMBH, Hochst (AT)

( * ) Notice: Subject to any disclaimer, the term of this patent is extended or adjusted under 35 U.S.C. 154(b) by 0 days.

(21) Appl. No.: 14/075,351

(22) Filed: Nov. 8, 2013

(65) Prior Publication Data

US 2014/0060991 A1  Mar. 6, 2014

Related U.S. Application Data

(63) Continuation of application No. PCT/AT2012/000131, filed on May 11, 2012.

(30) Foreign Application Priority Data

May 20, 2011  (AT) ..................................... 728/2011

(51) Int. Cl.
   *A47B 88/04*  (2006.01)
   *F16D 43/20*  (2006.01)

(52) U.S. Cl.
   CPC ................ *F16D 43/20* (2013.01); *A47B 88/04* (2013.01); *A47B 2210/0078* (2013.01); *E05Y 2201/62* (2013.01); *E05Y 2201/706* (2013.01)

(58) Field of Classification Search
   USPC ...................... 464/37; 312/331, 334.6, 334.46
   See application file for complete search history.

(56) References Cited

U.S. PATENT DOCUMENTS

| | | | |
|---|---|---|---|
| 2,501,648 A * | 3/1950 | Ogden | 464/37 X |
| 2,773,370 A * | 12/1956 | Intraub et al. | 464/37 |
| 4,184,576 A | 1/1980 | Kulischenko et al. | |
| 5,120,913 A * | 6/1992 | Leach et al. | 464/37 X |
| 2008/0054771 A1 | 3/2008 | Brunnmayr | |
| 2008/0188315 A1 | 8/2008 | Bosserdet | |
| 2009/0284114 A1 | 11/2009 | Fitz | |
| 2010/0283365 A1 | 11/2010 | Chen | |
| 2010/0320888 A1 | 12/2010 | Koenig et al. | |
| 2012/0038255 A1 | 2/2012 | Netzer et al. | |
| 2013/0127320 A1 * | 5/2013 | Greussing | 312/334.44 |

FOREIGN PATENT DOCUMENTS

| | | |
|---|---|---|
| CN | 101605480 | 12/2009 |
| CN | 101977534 | 2/2011 |
| DE | 1 829 633 | 4/1961 |

(Continued)

OTHER PUBLICATIONS

International Search Report (ISR) issued Sep. 13, 2012 in International (PCT) Application No. PCT/AT2012/000131.

(Continued)

*Primary Examiner* — Gregory Binda
(74) *Attorney, Agent, or Firm* — Wenderoth, Lind & Ponack, L.L.P.

(57) ABSTRACT

A synchronizing device for a movably mounted furniture part synchronizes a movement between at least two adjusting devices via a synchronizing rod. The synchronizing rod has at least two sub-shafts between which an overload protection device is arranged, and the overload protection device can release a relative rotational movement between the two sub-shafts when a specified holding torque between the two sub-shafts is exceeded.

20 Claims, 15 Drawing Sheets

(56) References Cited

FOREIGN PATENT DOCUMENTS

| DE | 20 2004 016 393 | 12/2005 |
| DE | 20 2010 001 558 | 4/2010 |
| EP | 1 036 526 | 9/2000 |
| EP | 1 875 026 | 1/2008 |
| EP | 2 248 442 | 11/2010 |
| EP | 2 351 608 | 8/2011 |
| JP | 2010-259782 | 11/2010 |
| WO | 2009/114885 | 9/2009 |
| WO | 2010/129971 | 11/2010 |

OTHER PUBLICATIONS

Austrian Patent Office Search Report (ASR) issued Nov. 25, 2011 in Austrian Patent Application No. A 728/2011.
Chinese Office Action issued Nov. 24, 2014 in corresponding Chinese Application No. 201280024186.3.

* cited by examiner

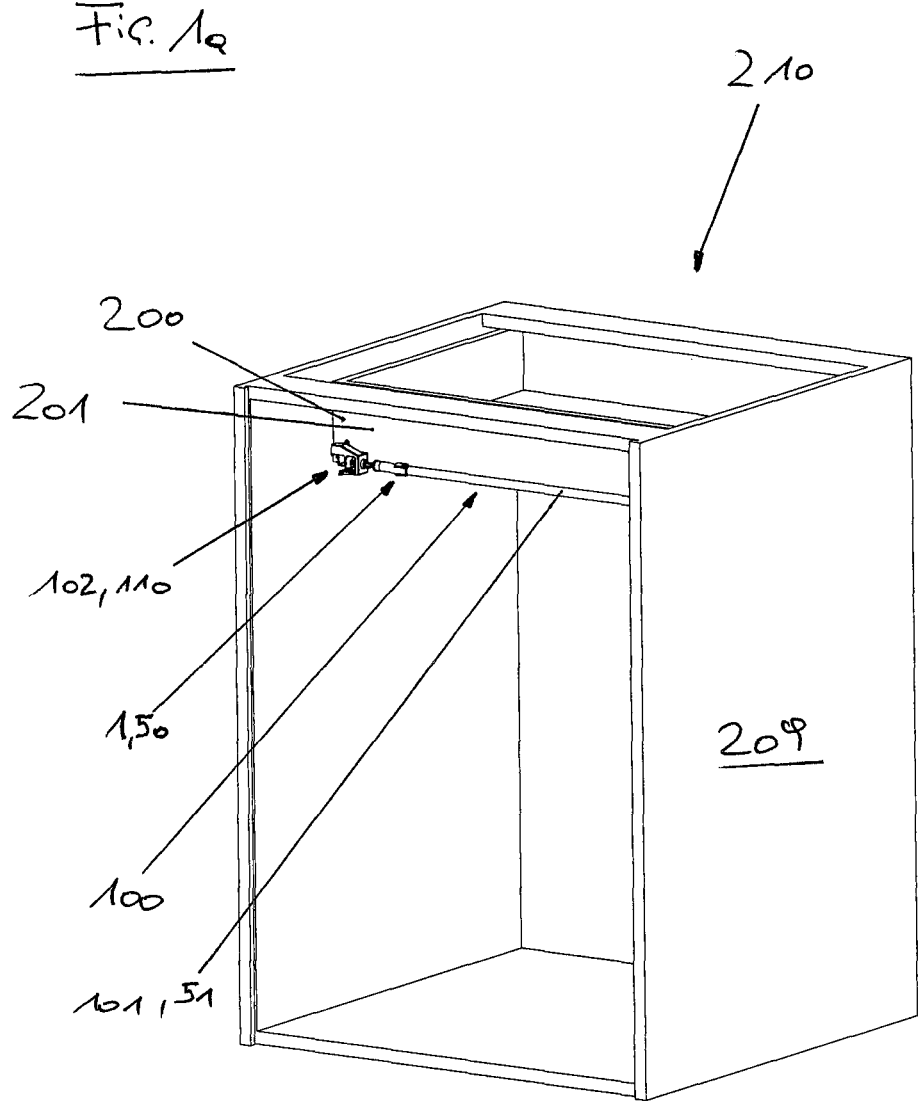

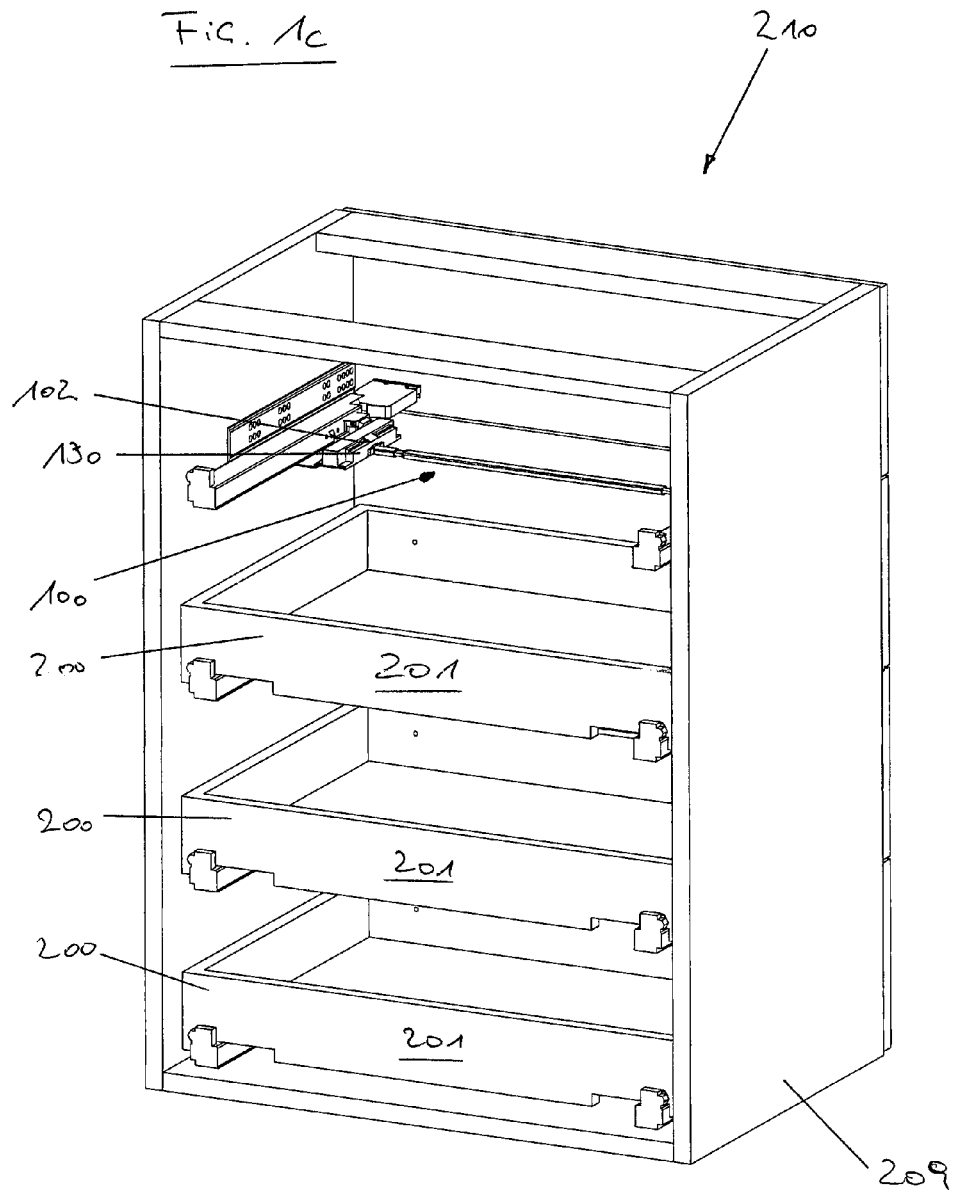

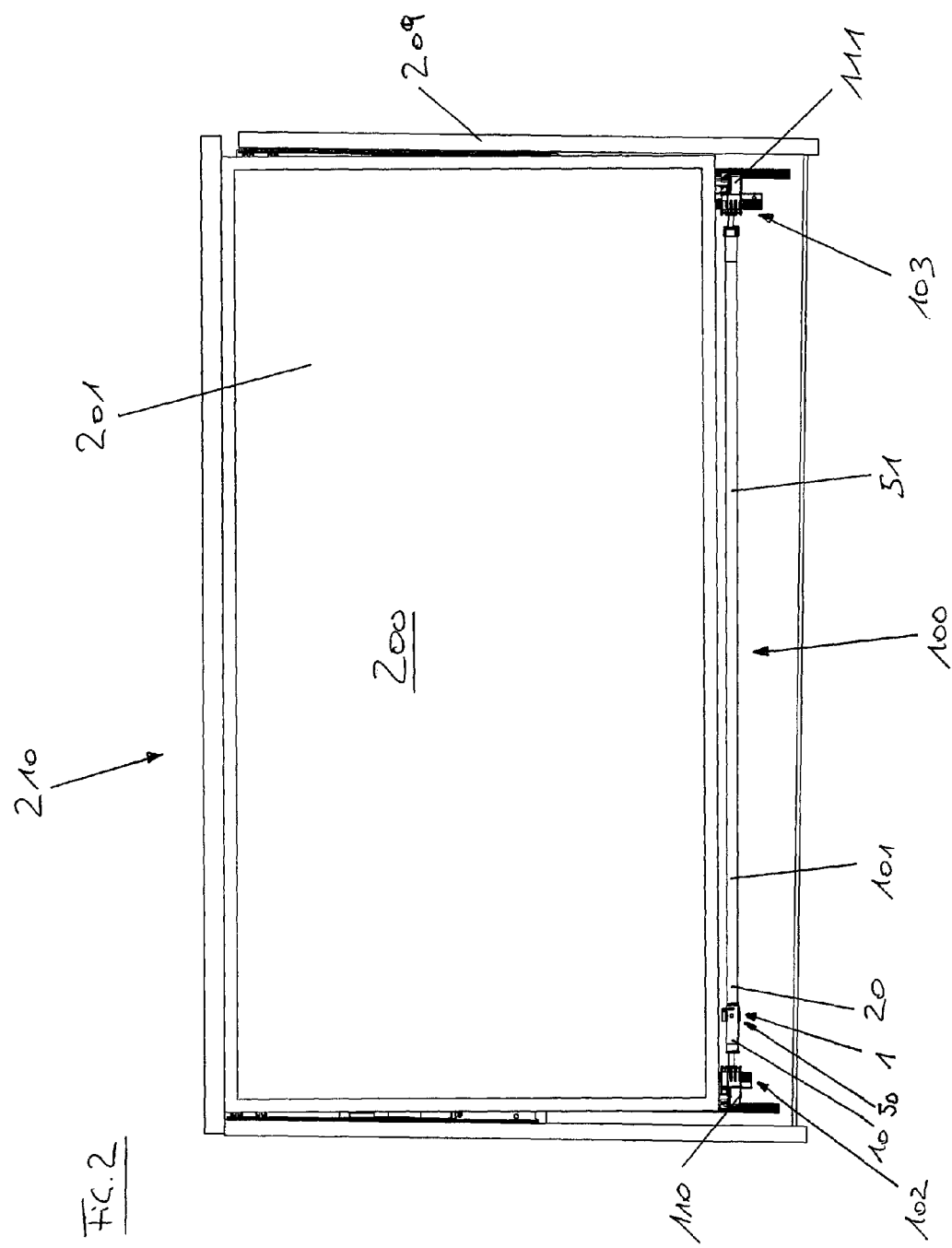

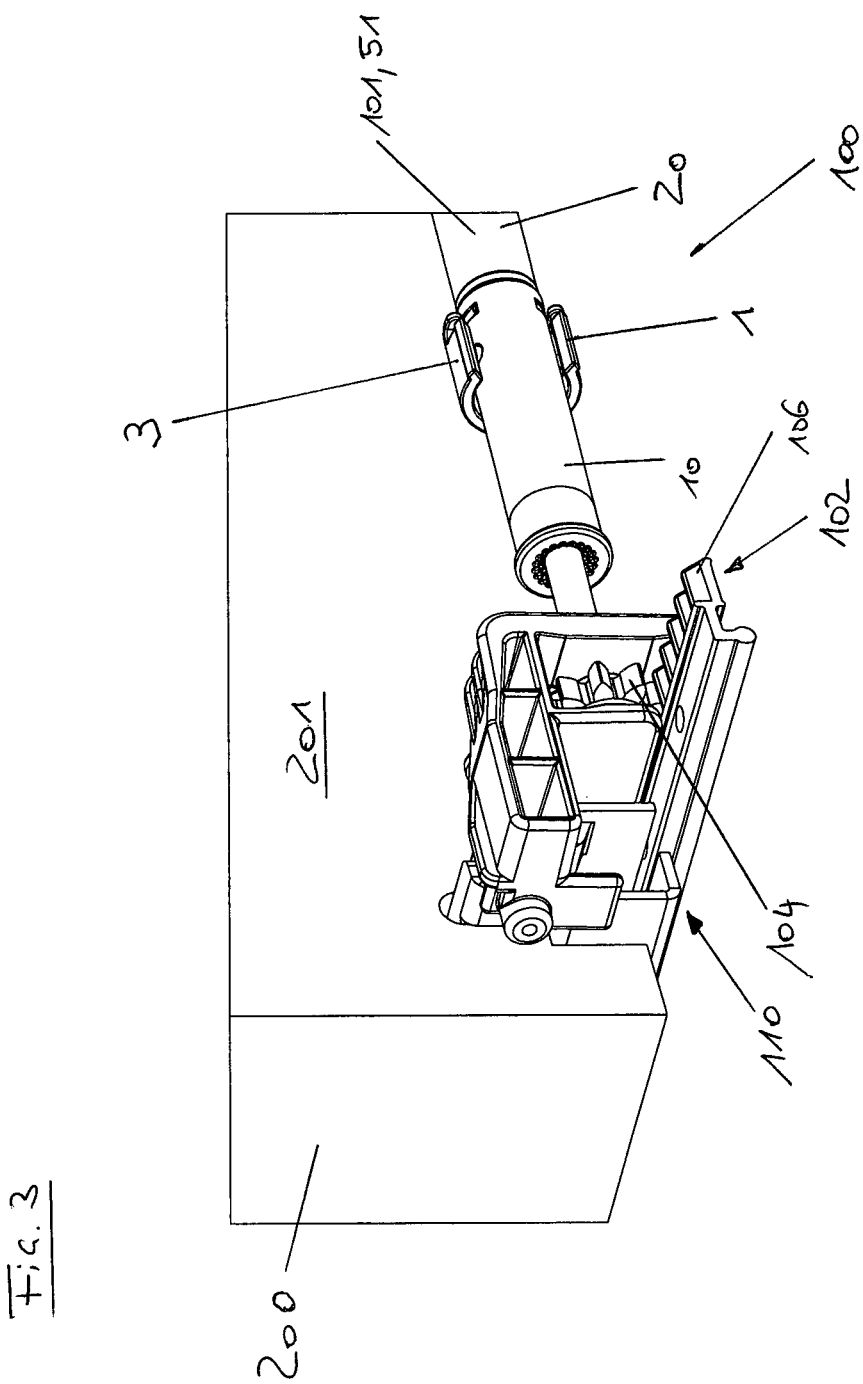

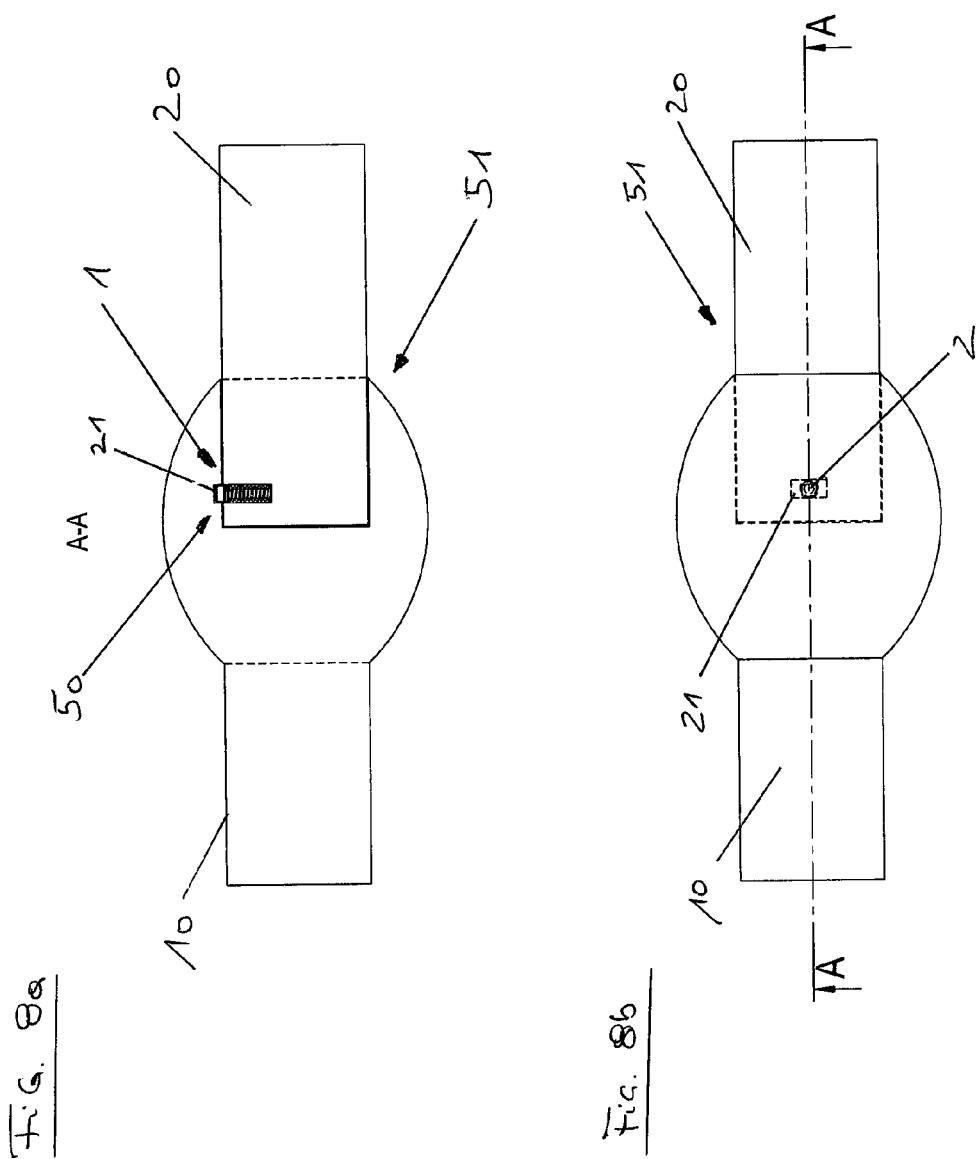

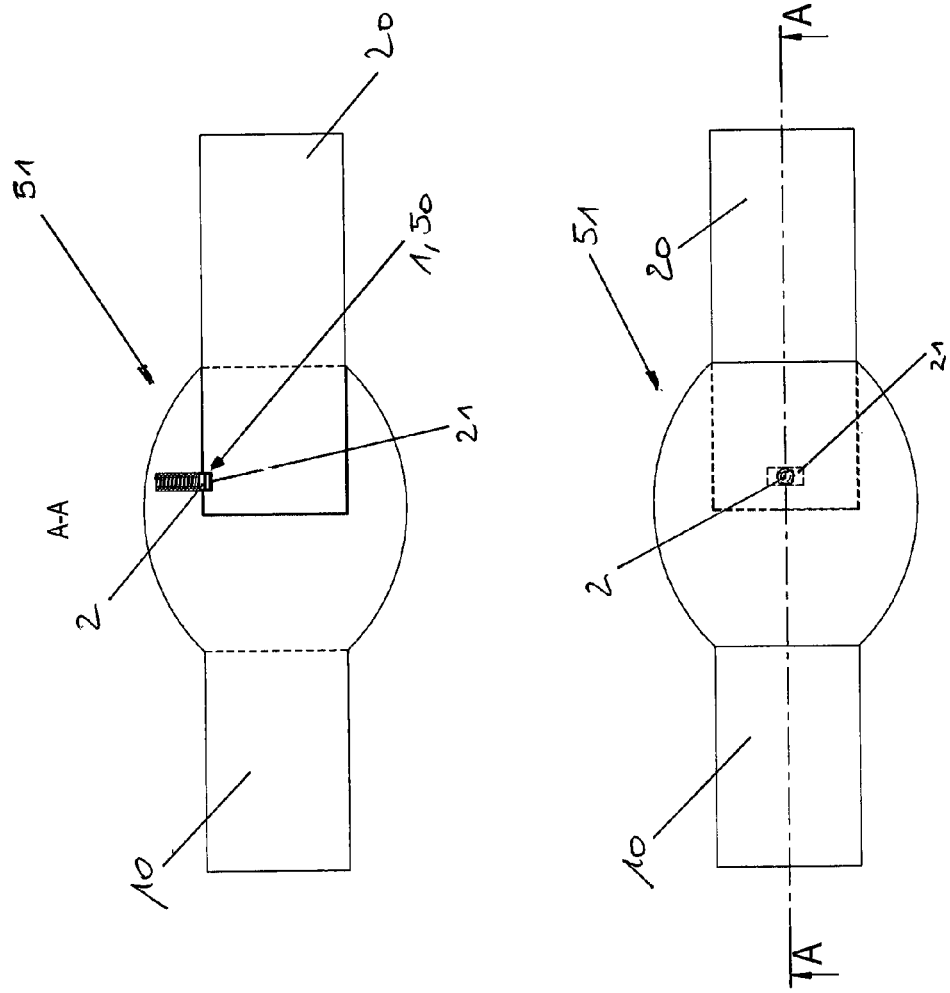

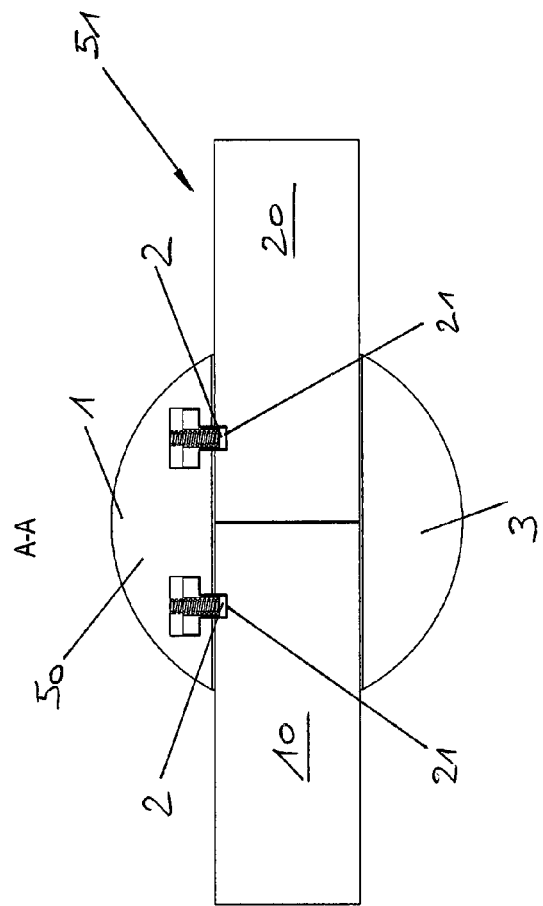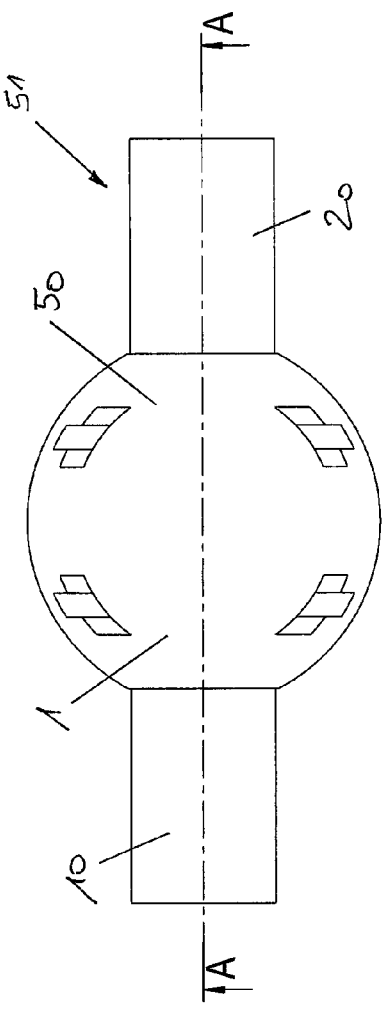
FIG. 10a
FIG. 10b

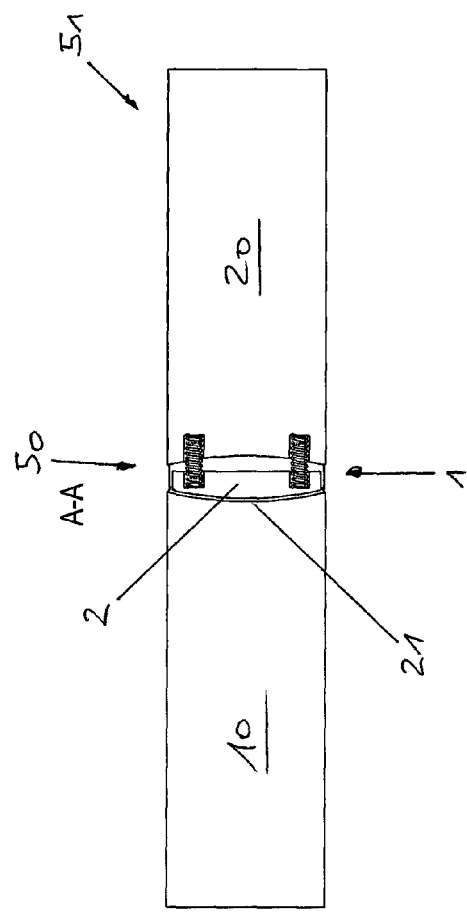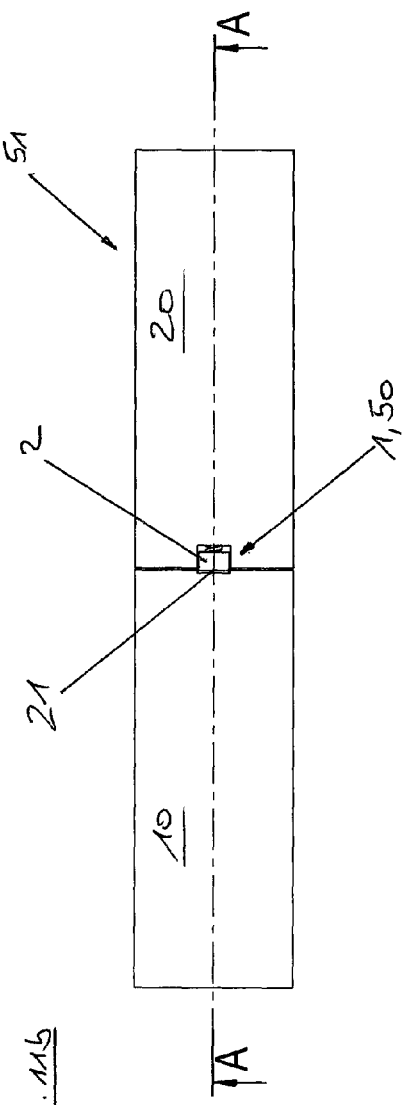

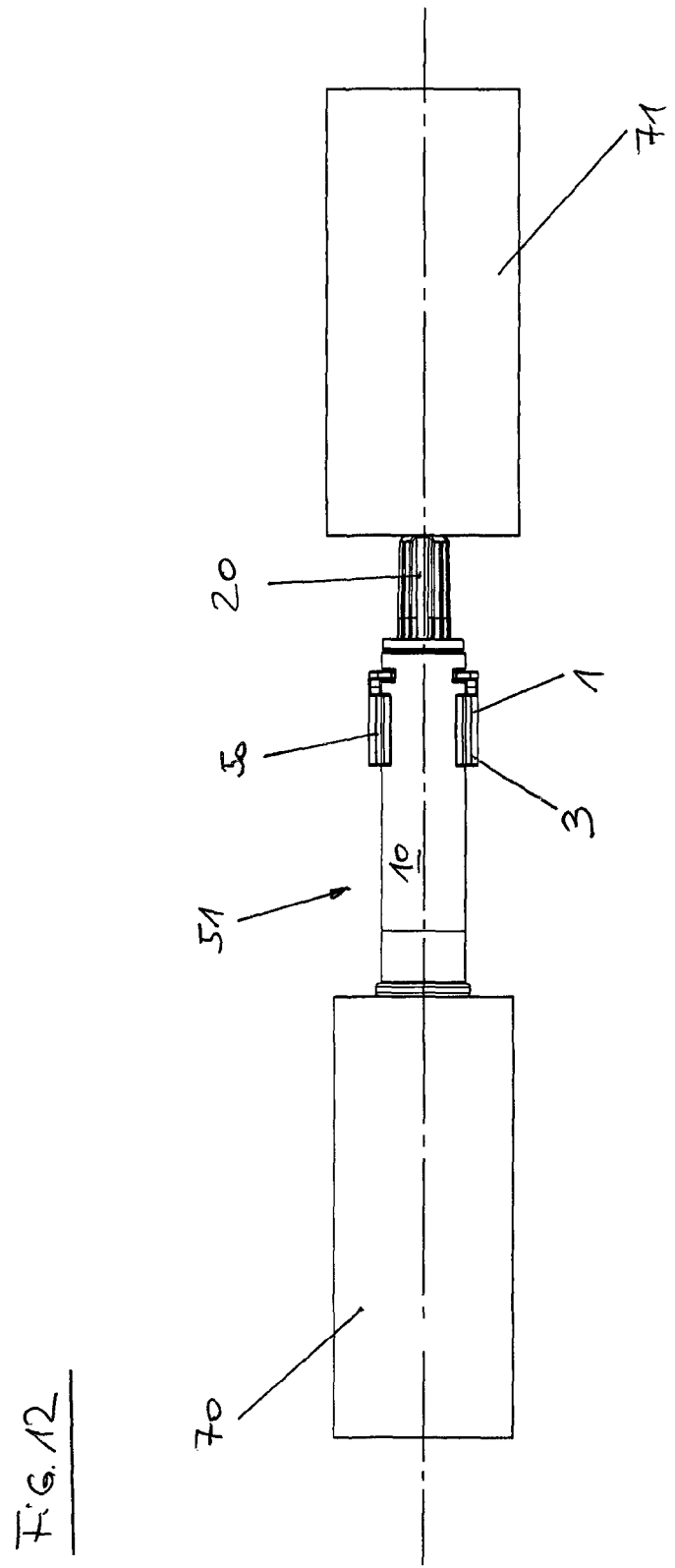

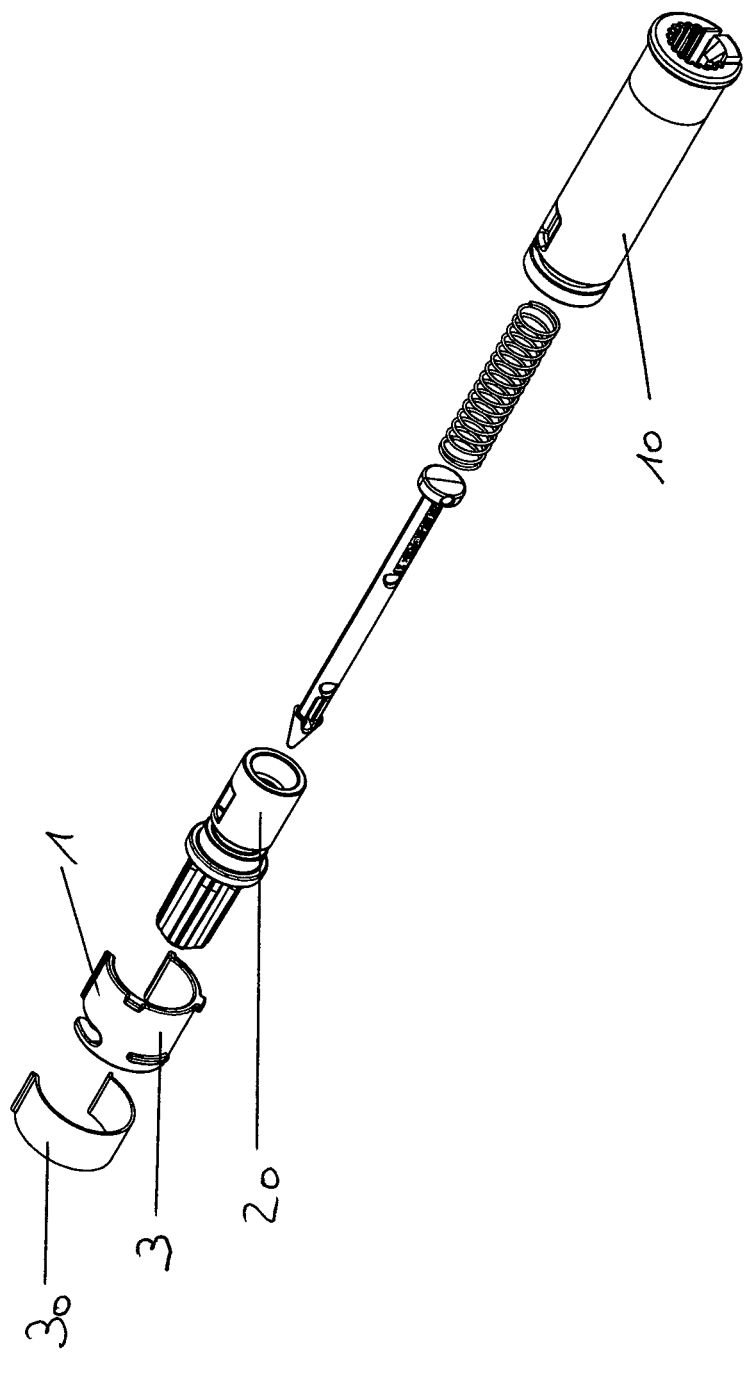

SYNCHRONIZING DEVICE FOR MOVABLY MOUNTED FURNITURE PART

BACKGROUND OF THE INVENTION

The invention concerns a synchronizing device for a movably mounted furniture part, in which the synchronizing device synchronizes a movement between at least two adjusting devices by way of a synchronizing rod.

The invention further concerns a coupling for an overload protection device comprising a torque-transmitting shaft, wherein the overload protection device is arranged between two shaft portions of the shaft.

The invention further concerns a movably mounted furniture part having a synchronizing device and/or a coupling as just stated. The invention also concerns an article of furniture having a movably mounted furniture part as mentioned.

Synchronizing devices for movably mounted furniture parts are already known in large numbers from the state of the art. Substantially in that respect, there are three different areas of application in relation to movably mounted furniture parts:
  synchronization of drawer extension guides for a drawer,
  synchronization of the adjusting drives of a furniture flap, and
  synchronization of lockable and unlockable ejection devices of movably mounted furniture parts.

Thus, for example, EP 1 036 526 B1 of Aug. 24, 2005 shows a drawer having a device for stabilizing the running characteristics of the drawer, in which the drawer is movable in a furniture carcass and has drawer frame members. Provided at both sides of the drawer are respective gears which respectively mesh with a rack on the carcass, and the two gears which are non-rotatably connected together are supported in mounting bodies.

EP 1 875 026 B1 dated Oct. 13, 2010 shows an article of furniture in cabinet form having side walls, to each of which is mounted a respective adjusting device having at least one movably mounted adjusting arm for moving a flap. The adjusting devices are connected by a synchronizing rod for synchronous movement thereof.

WO 2010/129971 A1 dated Nov. 18, 2010 shows an arrangement for locking and ejecting a movable furniture part comprising two unlockable ejection devices which are arranged at both sides on a furniture carcass or on the movable furniture part. The unlockable ejection devices are motionally coupled together by way of a rotatable synchronizing rod.

SUMMARY OF THE INVENTION

The object of the invention is to provide a synchronizing device which is improved over the state of the art for a movably mounted furniture part.

The use of an overload protection device which, when a predetermined holding torque between the two shaft portions of the synchronizing device is exceeded, enables a relative rotary movement between the two shaft portions makes it possible to prevent damage to the movably mounted furniture part.

It has proven to be particularly advantageous if the overload protection device has at least one radially or axially spring-loaded latching portion which engages into at least one of the two shaft portions—preferably into both shaft portions—and latches into at least one of the two shaft portions,—preferably into both shaft portions. The use of a spring-loaded latching portion makes it easily possible to make a connection between the overload protection device and the shaft portions.

In a preferred embodiment, the two shaft portions can fit into each other, and the spring-loaded latching portion of the overload protection device can be provided radially relative to the two shaft portions. The spring-loaded latching portion passes through the one shaft portion and latchingly engages in the other shaft portion. Two shaft portions which fit one into the other can provide that the spring-loaded latching portion can connect both shaft portions together.

Further, the overload protection device can be in the form of a resilient sleeve and have at least one radially inwardly directed latching nose which latches into at least one of the two shaft portions—preferably into both shaft portions. An overload protection device in the form of a resilient sleeve can embrace the two shaft portions and stationarily latchingly engage into the shaft portions by the radially inwardly directed latching nose.

It has been found to be particularly advantageous if the overload protection device is in one piece and/or the overload protection device is made from plastic and/or the overload protection device can be assembled and/or disassembled without a tool. That can contribute to achieving short assembly times.

Protection is also claimed for a coupling for an overload protection device, in particular for a synchronizing device in accordance with one of the described embodiments, having a torque-transmitting shaft, the overload protection device being arranged between two shaft portions of the shaft.

In that respect, it has proven to be particularly advantageous if the latching portion of the resilient sleeve is in the form of a latching nose and the counterpart latching means is in the form of an opening—preferably a blind hole.

In a preferred embodiment, the unlatched latching portion of the resilient sleeve automatically latches into the counterpart latching means of the other shaft portion again. Thus, no assistance from the outside is required—like for example by the operator—to restore the connection by way of the coupling.

Protection is also sought for a movably mounted furniture part having a synchronizing device and/or a coupling in accordance with one of the described embodiments.

Specifically protection is also sought for an article of furniture having a movably mounted furniture part with a synchronizing device and/or a coupling in accordance with one of the described embodiments.

BRIEF DESCRIPTION OF THE DRAWINGS

Further details and advantages of the present invention will be described more fully hereinafter by means of the specific description with reference to the embodiments by way of example illustrated in the drawings. In the drawings:

FIG. 1a shows a perspective rear view of an article of furniture having a drawer, FIG. 1c shows a perspective rear view of an article of furniture with drawers having an ejection device, FIG. 2 shows a view from below of an article of furniture having a drawer with a synchronizing device for the drawer extension guides, FIG. 3 shows a perspective rear view of a drawer extension guide and synchronizing device arranged thereon, FIG. 12 shows a diagrammatic view of a motor and two shaft portions with a coupling arranged therebetween, and FIG. 13 shows a perspective exploded view of an overload protection device with a spring steel sleeve.

DETAILED DESCRIPTION OF THE INVENTION

Figure 1B:
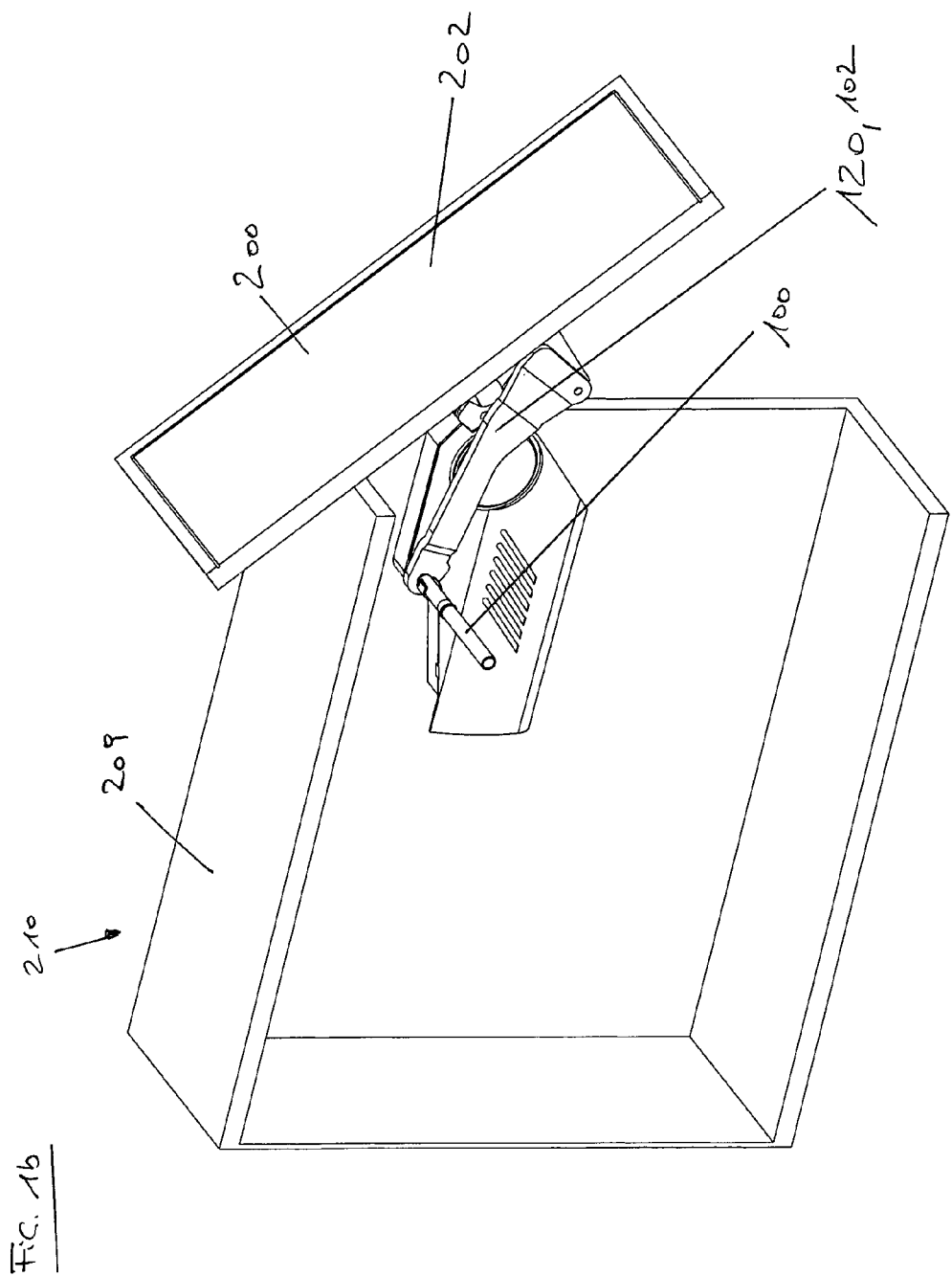
FIG. 1b shows a perspective sectional view of an article of furniture having a flap.

FIG. 1a is a perspective view of an article of furniture 210 with a movably mounted furniture part 200 arranged therein, which in this embodiment is in the form of a drawer 201. In this case, the drawer 201 is mounted movably in the furniture carcass 209. By way of the synchronizing device 100, the adjusting devices 102 and 103 (103 is not shown, see in that respect FIG. 2), which in this embodiment are in the form of drawer extension guides (110 and 111) (111 is not shown, see in that respect FIG. 2) are synchronized. The overload protection device 1 is provided at the synchronizing device 100. The overload protection device 1 is provided in this case on the torque-transmitting shaft 51 which in this embodiment acts as a synchronizing rod 101. The overload protection device 1 or the coupling 50 acts in this case between the two shaft portions (not shown here) of the shaft 51 (for the shaft portions, see FIG. 3).

FIG. 1b shows an article of furniture 210 having a furniture flap 202. The furniture flap 202 is moved by way of two adjusting devices 102 and 103 (103 is not shown) which, in this embodiment, are in the form of adjusting drives 120 for the furniture flap 202. The two adjusting drives 120 (only one is shown) are connected together by way of the synchronizing device 100 and are synchronized by way thereof. The synchronizing device 100 also has an overload protection device 1 (not shown here) which, when a predetermined holding torque is exceeded, enables a relative rotary movement between the two adjusting devices 102 and 103 and can thus prevent damage to the adjusting drives 120.

FIG. 1c shows an article of furniture 210 having a furniture carcass 209, with a plurality of movably mounted furniture parts 200 (in this embodiment in the form of drawers 201). The adjusting devices 102 and 103 (103 is not shown) are in this embodiment in the form of lockable and unlockable ejection devices 130 for the movably mounted furniture part 200. The synchronizing device 100 acts between the lockable and unlockable ejection devices. The synchronizing device 100 further has an overload protection device 1 (not shown here).

FIG. 2 shows a view from below of an article of furniture 210. The article of furniture 210 has a movably mounted furniture part 200 which in this embodiment is in the form of a drawer 201. Disposed at the rear side of the drawer is the synchronizing device 100 for the movably mounted furniture part 200. The synchronizing device 100, by way of the synchronizing rod 101, synchronizes a movement between the two adjusting devices 102 and 103, wherein the synchronizing rod 101 has two shaft portions 10 and 20, between which is arranged an overload protection device 1. When a predetermined holding torque is exceeded between the two shaft portions 10 and 20, the overload protection device 1 enables a relative rotary movement between the two shaft portions 10 and 20.

At the left and at the right, the synchronizing device 100 has a respective gear 104 (see FIG. 3). The gears 104 respectively engage at the left and the right into the racks 106 (see FIG. 3).

The synchronizing device 100 serves to provide that the adjusting devices 102 and 103—in the case of this drawer 201 in the form of drawer extension guides 110 and 111—are synchronized. By virtue of possible incorrect operation by a user—as shown in FIG. 2—the drawer 201 can be disposed inclinedly relative to the furniture carcass 209 (for example by a one-sided loading on the drawer 201).

If as a further consequence the drawer 201 were also further pushed into the furniture carcass 209 in its drawer position in which it is not yet in the end position, that could result in damage to the synchronizing device 100. For that reason, the synchronizing device 100 has the overload protection device 1 which, when a predetermined holding torque is exceeded between the two shaft portions 10 and 20 of the shaft 51 or the synchronizing rod 101, enables a relative rotary movement between the two shaft portions 10 and 20.

In this preferred embodiment, the overload protection device 1 has a coupling 50 which is in the form of a sleeve 3 (not shown, see in that respect FIGS. 3 through 7).

FIG. 3 shows a perspective rear view of a detail of a drawer 201. The drawer 201 is movable by way of the drawer extension guide 110. For synchronization reasons, between the left-hand and the right-hand drawer extension guides 110 and 111 (not shown) there is provided the synchronizing device 100 which in this embodiment is provided with an overload protection device 1 in sleeve form.

The mode of operation of the overload protection device 1 is described in greater detail in the specific description hereinafter.

In this embodiment, the synchronizing device 100 drives a gear 104 and, on the opposite side of the shaft 51 or the synchronizing rod 101, a further gear (not shown). Those two gears 104 engage into the racks 106 and move therein. The gears 104 together with the racks 106 form the adjusting devices 102 and 103 (not shown, see FIG. 2).

Figure 5A:
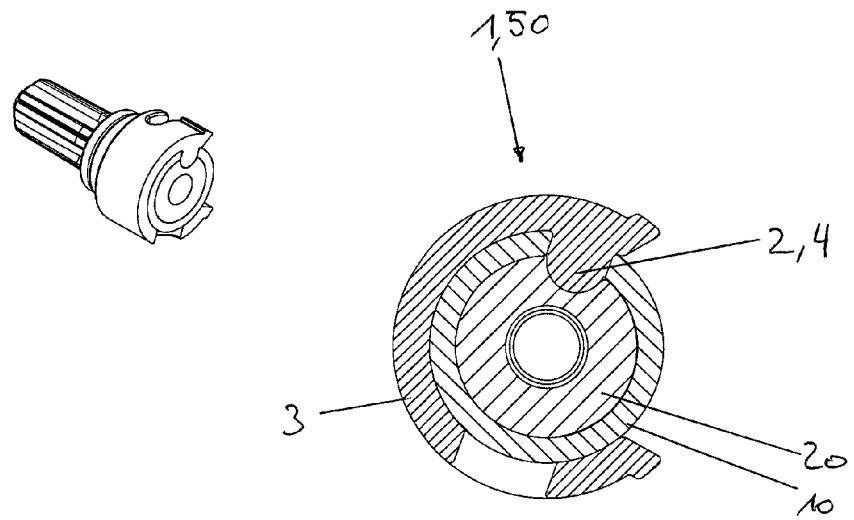
FIG. 5a shows a section through two shaft portions with overload protection device and coupling.
Figure 6A:
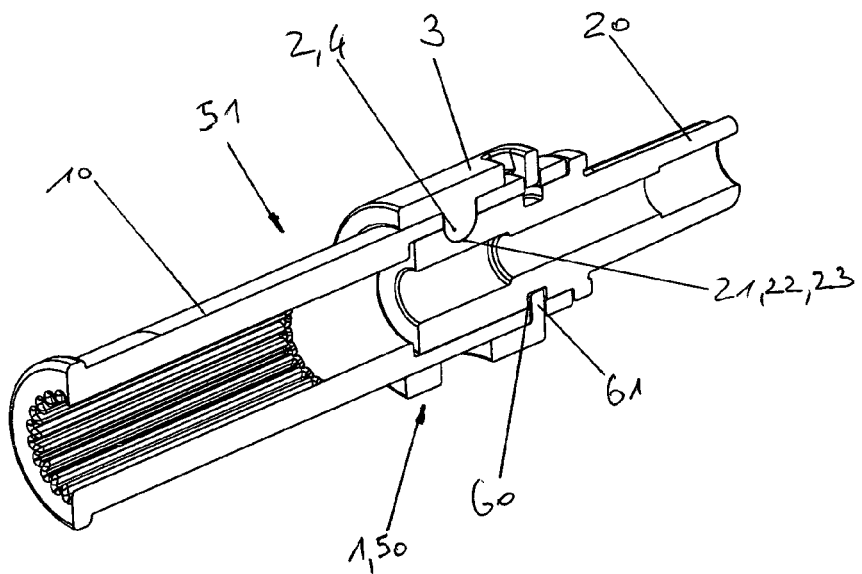
FIG. 6a shows a perspective axial section through two shaft portions with overload protection device.

The two shaft portions 10 and 20 of the synchronizing rod 101 or the shaft 51 are fitted into each other in this preferred embodiment and have the coupling 3 or a latching portion of the coupling 3 passing radially therethrough or penetrate into the inner (second) shaft portion 20 (see in that respect FIGS. 5a and 6a).

It will be appreciated that a synchronizing device 100 shown here can be envisaged not only for a drawer 201 but equally for any other movably mounted furniture part 200 like, for example, the adjusting drives (not shown here) of a furniture flap 202 or also for a lockable and unlockable ejection device (not shown here) for movably mounted furniture parts 200 (see in that respect FIGS. 1a to 1c and the description thereof).

Figure 4:
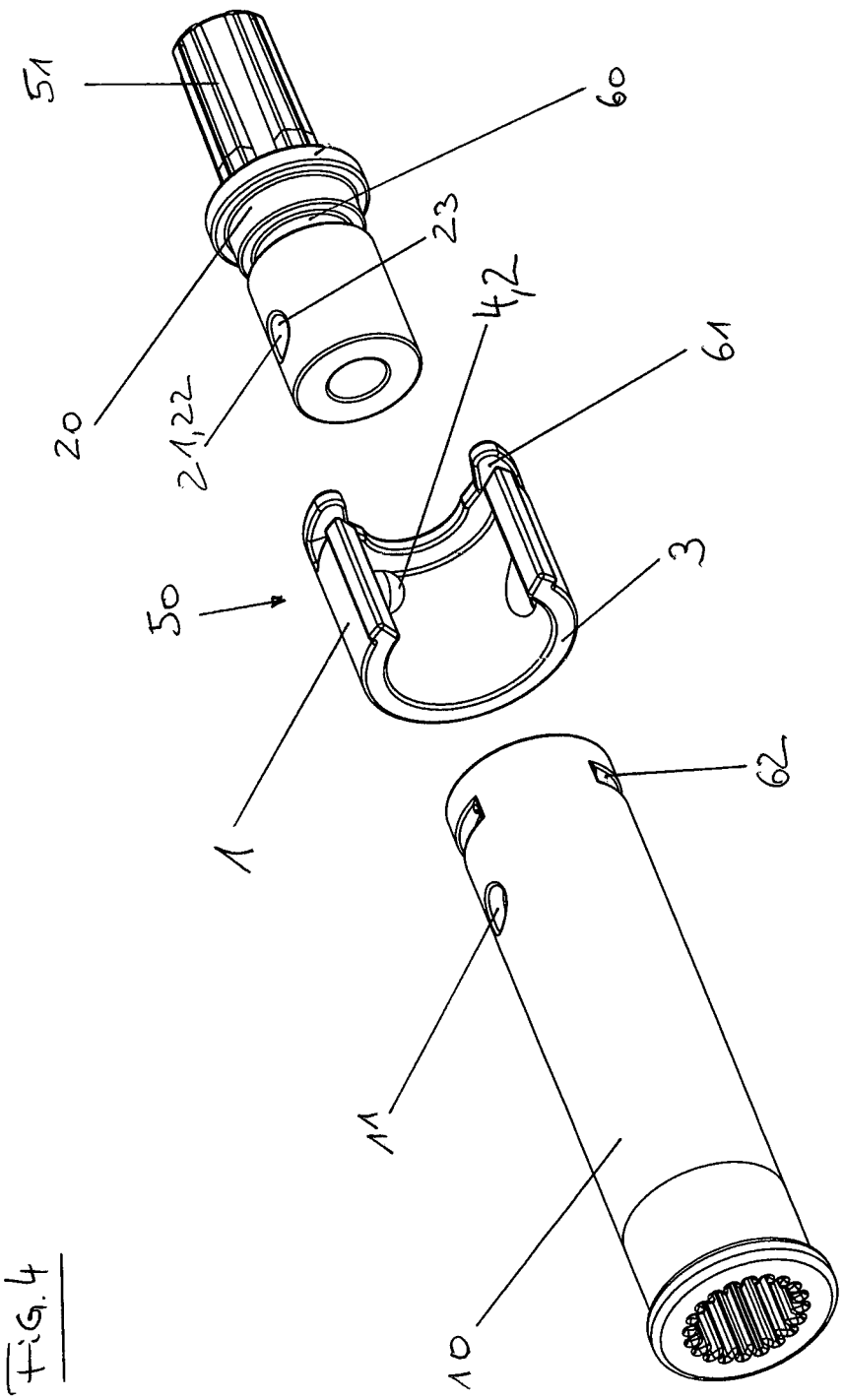
FIG. 4 shows a perspective exploded view of the synchronizing device with overload protection device or coupling.

FIG. 4 shows a perspective exploded view of the two shaft portions 10 and 20 and of the overload protection device 1 or the coupling 50.

The overload protection device 1 has the coupling 50 which again is in the form of a resilient sleeve 3. The resilient sleeve 3 has the spring-loaded latching portion 2 which in this preferred embodiment is in the form of a latching nose 4 directed radially inwardly. That radially inwardly directed latching nose 4 engages through the opening 11 in the first shaft portion 10 and then passes into the counterpart latching element 21 of the second shaft portion 20 and remains therein until a predetermined torque is exceeded. In this preferred embodiment, the counterpart latching element 21 is in the form of an opening 22, more precisely a blind recess hole 23. The precise mode of operation is described in greater detail in FIGS. 5a and 5b. The overload protection device 1 here further also has a radially inwardly directed leg 61 which passes through the opening 62 in the first shaft portion 10 and remains in the radial groove 60 in the second shaft portion 20. That provides for determining the position of the shaft portion 20 relative to the shaft portion 10 both when the overload protection device 1 is not activated and also when it is activated. As a result, the two shaft portions 10 and 20 remain connected together, even when the coupling 50 is opened, as only the resilient latching portion 2 of the coupling 50 is unlatched from the shaft portion 20, but not in contrast the leg 61 (see in that respect FIG. 5b).

Figure 5B:
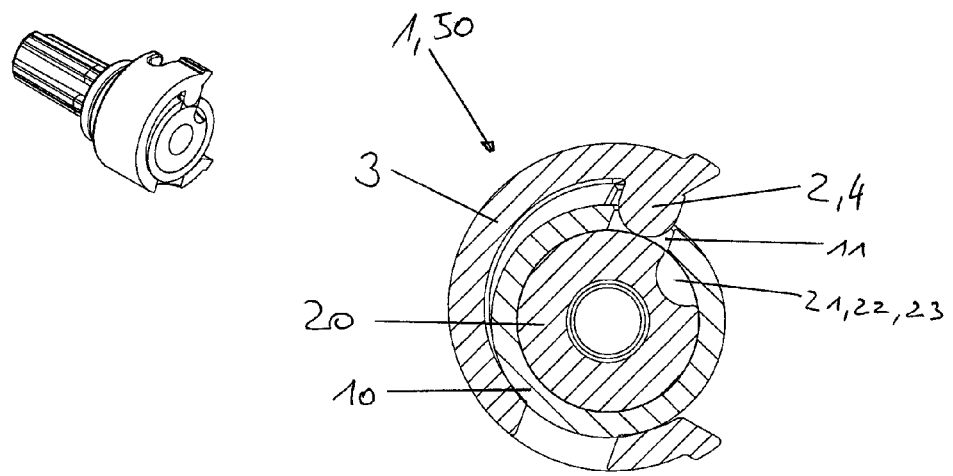
FIG. 5b shows a section through two shaft portions with activated overload protection device.

FIGS. 5a and 5b show two sectional views through the two shaft portions 10 and 20 and the overload protection device 1 which in this preferred embodiment has the coupling 50.

In this embodiment, the two shaft portions 10 and 20 are fitted into each other, that is to say the shaft portion 20 is partially disposed in the interior of the shaft portion 10. The coupling 50 in the form of the sleeve 30 embraces the shaft portion 10 and passes through the shaft portion 10 through the opening 11. More precisely, the latching portion 2 in the form of the latching nose 4 passes through that opening 11 in the shaft portion 10. When the coupling between the two shaft portions 10 and 20 is made, the latching nose 4 is supported in the counterpart latching element 21 of the shaft portion 20.

If a predetermined torque between the two shaft portions 10 and 20 is exceeded, the latching nose 4 is disengaged from the counterpart latching element 21 which is in the form of the blind hole (recess) 23, and the shaft portion 20 can rotate relative to the shaft portion 10. During that rotation, the latching nose 4 remains in the opening 11 in the shaft portion 10 and waits for the two shaft portions 10 and 20 to be oriented relative to each other again, whereupon the latching nose 4 again completely automatically comes into latching engagement in the blind hole 23. So that the two shaft portions 10 and 20 cannot become released from each other during the 'unlatched' condition of the coupling 50 from the blind hole 23 in the shaft portion 20, the synchronizing device additionally has a holding device which holds the two shaft portions 10 and 20 together (see in that respect FIGS. 6a and 6b). In this preferred embodiment, the holding device is—at least partially—provided on the coupling 50 or the overload protection device 1.

Figure 6B:
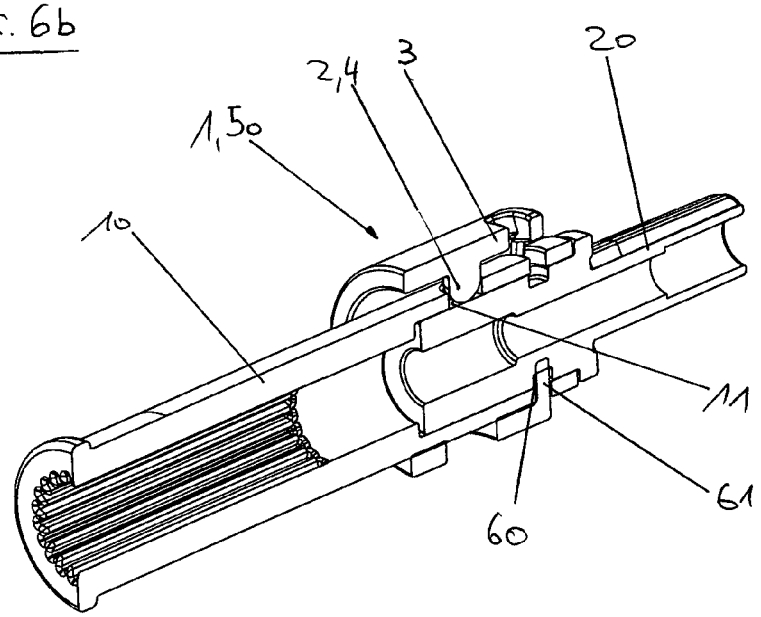
FIG. 6b shows a section through two shaft portions with activated overload protection device.

FIGS. 6a and 6b show a perspective section through the two shaft portions 10 and 20 and the overload protection device 1 or the coupling 50 in the latched condition (FIG. 6a) and in the unlatched condition (FIG. 6b). In regard to the function of the overload protection device 1 or the coupling 50, the details just mentioned in relation to FIGS. 5a and 5b apply here.

FIGS. 6a and 6b clearly show the holding device which is formed by the radially extending groove 60 in the second shaft portion 20, the leg 61 of the overload protection device 1 and the opening 62 (see FIG. 4) of the first shaft portion 10. Even when the overload protection device 1 is activated or the coupling 50 is released (FIG. 6b) the leg 61 remains in the groove 60 in the second shaft portion 20, whereby the second shaft portion 20 can admittedly rotate relative to the first shaft portion 10, but they cannot be detached from each other (i.e., cannot be moved relative to each other in an axial direction of the synchronization rod 101).

Figure 7A:
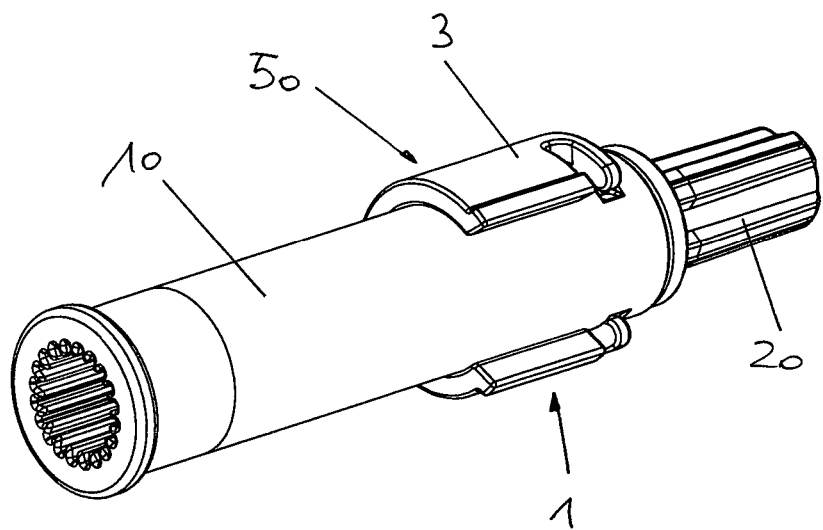
FIG. 7a shows a perspective view of two shaft portions with overload protection device or coupling.
Figure 7B:
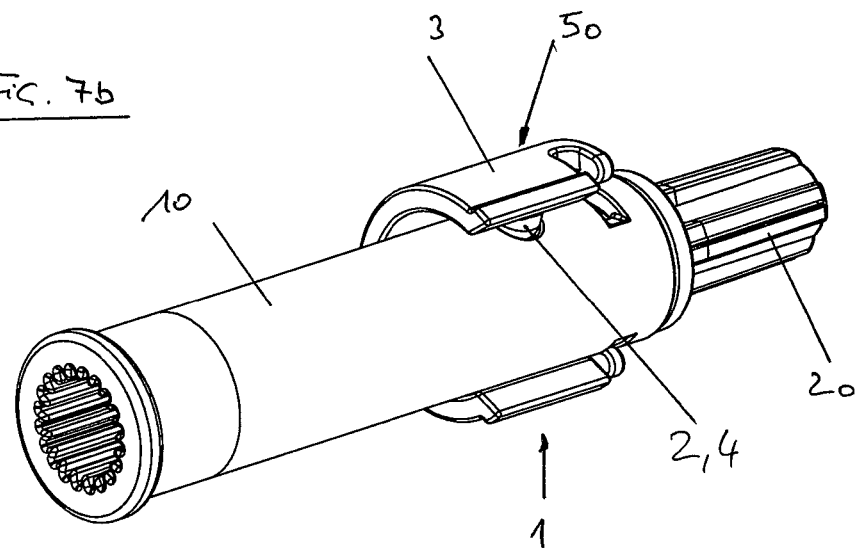
FIG. 7b shows a perspective view of two shaft portions with activated overload protection device, FIGS. 8a-8b, 9a-9b, 10a-10b, and 11a-11b all show diagrammatic views of different overload protection devices or couplings on two shaft portions and sections in relation thereto.

FIGS. 7a and 7b show a perspective view of the two shaft portions 10 and 20 with the overload protection device 1 which here is in the form of a coupling 50.

In FIG. 7a, the coupling 50 is in the latched condition while in FIG. 7b the coupling 50 is unlatched, that is to say the latching portion 2, more precisely the latching nose 4, is no longer in the counterpart latching element 21 (not shown). Thus, the two shaft portions 10 and 20 can be rotated relative to each other, which takes place automatically when a predetermined torque is exceeded. Equally automatically or autonomously, the latching nose 4 latches into the shaft portion 20 again within it is again with its counterpart latching element 21 at the latching nose 4.

FIGS. 8a through 11b show various variants of an overload protection device 1 or a coupling 50 for a torque-transmitting shaft 51 and the two shaft portions 10 and 20 thereof and are now described in greater detail:

FIGS. 8a and 8b show the two shaft portions 10 and 20 of the torque-transmitting shaft 51, wherein provided in the second shaft portion 20 is the spring-loaded latching portion 2 which latchingly engages into a counterpart latching element 21 of the first shaft portion 10.

In FIGS. 9a and 9b, the spring-loaded latching portion 2 is provided in the first shaft portion 10 and in that case latchingly engages under spring loading into the counterpart latching element 21 of the second shaft portion 20.

In FIGS. 10a and 10b, the two shaft portions 10 and 20 are not fitted into each other but bear against each other at their ends. In this embodiment, the two spring-loaded latching portions 2 are provided in the coupling 50 and project into the counterpart latching element 21 of the two shaft portions 10 and 20.

In FIGS. 11a and 11b, the overload protection device 1 is provided axially relative to the two shaft portions 10 and 20. The spring-loaded latching portion 2 latchingly engages from the second shaft portion 20 into the counterpart latching element 21 of the first shaft portion 10.

It will be self-evident that both the spring-loaded latching portion 2 and also the counterpart latching element 21 can also be respectively provided on the other shaft portion 10 or 20 respectively. It will be appreciated that this equally applies to all other embodiments set forth here.

FIG. 12 shows a diagrammatic view of a drive 70 driving a torque-transmitting shaft 51. The torque-transmitting shaft 51 further transmits a torque to the drive output 71.

In this case, the shaft 51 has the two shaft portions 10 and 20, between which is provided the coupling 50 as an overload protection device 1. The coupling 50 has a resilient sleeve 3 which is mounted to one of the two shaft portions 10 or 20 respectively and which carries a latching portion 2 (see FIG. 5a) which latchingly engages into a counterpart latching element 21 (see FIG. 5b) of the other shaft portion 10 or 20 and which automatically unlatches when a predetermined holding torque is exceeded and enables a relative rotary movement between the two shaft portions 10 and 20.

FIG. 13 shows a perspective exploded view of the two shaft portions 10 and 20 with an overload protection device 1 which in this preferred embodiment is in the form of a sleeve 3 or has such a sleeve. In this preferred embodiment, the sleeve 3 is made from plastic and is also in one piece. That permits quick assembly. The assembly operation itself can in that case be effected completely without any tool as the sleeve 3 simply has to be just clipped on.

To increase the stability of the plastic sleeve 3, it is additionally possible in this preferred embodiment to provide a spring steel sleeve 30 which is also preferably clipped over the sleeve 3.

The invention claimed is:

1. A movably mounted furniture part comprising:
a furniture part; and
a synchronizing device connected to said furniture part, said synchronizing device including:
   a synchronizing rod for synchronizing movement between at least two adjusting devices, said synchronizing rod including at least two shaft portions; and
   an overload protection device between said at least two shaft portions of said synchronizing rod, said overload protection device being configured to enable a relative rotary movement between said at least two shaft portions when a predetermined holding torque is exceeded between said at least two shaft portions;
   wherein said overload protection device comprises a coupling arranged between two of said at least two shaft portions of said synchronization rod, said coupling comprising a resilient sleeve mounted on a first one of said at least two shaft portions, said resilient sleeve having a latching portion for latching into a counterpart latching element of a second one of said at least two shaft portions, said latching portion being configured to automatically unlatch from said counterpart latching element when a predetermined holding torque between said first one of said at least two shaft portions and said second one of said at least two shaft portions is exceeded so as to enable a relative rotary movement between said at least two shaft portions.

2. The movably mounted furniture part as set forth in claim 1, wherein said at least two adjusting devices are one of drawer extension guides, adjusting drives of a furniture flap, or lockable and unlockable ejection devices for the movably mounted furniture part.

3. The movably mounted furniture part as set forth in claim 1, wherein each of said at least two adjusting devices includes at least one gear.

4. The movably mounted furniture part as set forth in claim 3, wherein each of said at least two adjusting devices further includes a rack into which said respective at least one gear engages.

5. The movably mounted furniture part as set forth in claim 1, wherein said overload protection device is located axially between said at least two shaft portions, or is located radially with respect to said at least two shaft portions.

6. The movably mounted furniture part as set forth in claim 1, wherein said overload protection device has at least one spring-loaded latching portion for engaging into at least one of said at least two shaft portions and latching into said at least one of said at least two shaft portions, said at least one spring-loaded latching portion being radially or axially spring loaded.

7. The movably mounted furniture part as set forth in claim 6, wherein said at least one spring-loaded latching portion is configured to engage into all of said at least two shaft portions and latch into all of said at least two shaft portions.

8. The movably mounted furniture part as set forth in claim 7, wherein said at least two shaft portions fit into each other, and said spring-loaded latching portion is arranged radially relative to said at least two shaft portions, said spring-loaded latching portion being configured to pass through a first one of said shaft portions and latchingly engage into a second one of said shaft portions.

9. The movably mounted furniture part as set forth in claim 6, wherein said at least two shaft portions fit into each other, and said spring-loaded latching portion is arranged radially relative to said at least two shaft portions, said spring-loaded latching portion being configured to pass through a first one of said shaft portions and latchingly engage into a second one of said shaft portions.

10. The movably mounted furniture part as set forth in claim 1, wherein said overload protection device has a radially inwardly directed latching nose configured to latch into at least one of said at least two shaft portions.

11. The movably mounted furniture part as set forth in claim 10, wherein said radially inwardly directed latching nose is configured to latch into all of said at least two shaft portions.

12. The movably mounted furniture part as set forth in claim 1, wherein said overload protection device is configured to have at least one of: a one-piece construction, made of plastic, and inserted or removed without a tool.

13. The movably mounted furniture part as set forth in claim 1, further comprising a spring steel sleeve embracing said overload protection device.

14. An article of furniture comprising the movably mounted furniture part as set forth in claim 1.

15. The movably mounted furniture part as set forth in claim 1, wherein said at least two shaft portions fit into each other, and said latching portion of said resilient sleeve is configured to pass through an opening in said first one of said at least two shaft portions and latch into said counterpart latching element of said second one of said at least two shaft portions.

16. The movably mounted furniture part as set forth in claim 15, wherein said latching portion is configured to remain in said opening in said first one of said at least two shaft portions during its unlatched condition, and to automatically latch into said counterpart latching element of said second one of said at least two shaft portions when in an unlatched condition.

17. The movably mounted furniture part as set forth in claim 15, wherein said latching portion of said resilient sleeve is formed as a latching nose, and said counterpart latching element is formed as a recess.

18. The movably mounted furniture part as set forth in claim 1, said latching portion is configured to automatically latch into said counterpart latching element of said second one of said at least two shaft portions when in an unlatched condition.

19. The movably mounted furniture part as set forth in claim 1, wherein said coupling is configured to have at least one of: a one-piece construction, made of plastic, and inserted or removed without a tool.

20. The movably mounted furniture part as set forth in claim 1, further comprising a spring steel sleeve embracing said coupling.

* * * * *